(12) United States Patent
Kyle et al.

(10) Patent No.: US 10,518,842 B1
(45) Date of Patent: Dec. 31, 2019

(54) BOAT HULL

(71) Applicants: James H. Kyle, Alstead, NH (US); Lisa C. Hix, Alstead, NH (US)

(72) Inventors: James H. Kyle, Alstead, NH (US); Lisa C. Hix, Alstead, NH (US)

(*) Notice: Subject to any disclaimer, the term of this patent is extended or adjusted under 35 U.S.C. 154(b) by 0 days.

(21) Appl. No.: 16/191,982

(22) Filed: Nov. 15, 2018

(51) Int. Cl.
*B63B 1/20* (2006.01)
*B63B 1/04* (2006.01)
*B63B 1/06* (2006.01)
*B63B 1/08* (2006.01)

(52) U.S. Cl.
CPC .............. *B63B 1/042* (2013.01); *B63B 1/06* (2013.01); *B63B 1/08* (2013.01); *B63B 1/20* (2013.01)

(58) Field of Classification Search
CPC .. B63B 1/042; B63B 1/06; B63B 1/08; B63B 1/20
See application file for complete search history.

(56) References Cited

U.S. PATENT DOCUMENTS

| | | |
|---|---|---|
| 1,189,227 A | 7/1916 | Baker |
| 1,204,355 A | 11/1916 | Hickman |
| 1,316,762 A | 9/1919 | Bigelow |
| 1,620,349 A | 3/1927 | Hickman |
| 1,644,725 A | 10/1927 | Hickman |
| 2,366,590 A | 1/1945 | Brownback |
| 2,515,005 A | 7/1950 | Hickman |
| 2,945,466 A | 7/1960 | Shelton |
| D197,099 S | 12/1963 | Torreson |
| 3,113,543 A | 12/1963 | Brownback |
| 3,225,729 A | 12/1965 | Ewing, Jr. |
| 3,236,202 A | 2/1966 | Quady et al. |
| 3,446,174 A | 5/1969 | Ballu |
| 3,709,179 A | 1/1973 | Payne |
| 3,800,725 A | 4/1974 | L'Heureaux |
| 3,996,869 A | 12/1976 | Hadley |
| 4,002,131 A | 1/1977 | Mangrum |
| 4,192,248 A | 3/1980 | Moyer |
| 5,231,949 A | 8/1993 | Hadley |
| 5,497,722 A | 3/1996 | English, Sr. |
| 5,499,593 A * | 3/1996 | Raab ........................ B63B 1/20 114/271 |

(Continued)

FOREIGN PATENT DOCUMENTS

| | | |
|---|---|---|
| JP | S62247993 A | 10/1987 |
| JP | H06227479 A | 8/1994 |

(Continued)

*Primary Examiner* — Stephen P Avila
(74) *Attorney, Agent, or Firm* — Simpson & Simpson, PLLC

(57) ABSTRACT

A boat hull having a design water line, the boat hull including a bow, a stern, a starboard side having a starboard chine and a starboard gunwale, a port side having a port chine and a port gunwale, a hull center line, and a bottom surface formed between the bow, the stern, the starboard chine and the port chine. The bottom surface includes first, second and third portions. The first portion is proximate the bow and includes a first concave surface and a second concave surface, the first concave surface projects from the hull center line towards the starboard chine and the second concave surface projects from the hull center line towards the port chine. The second portion is proximate the stern and includes a first convex surface and a second convex surface.

23 Claims, 13 Drawing Sheets

(56) References Cited

U.S. PATENT DOCUMENTS

| | | | |
|---|---|---|---|
| 5,544,609 A * | 8/1996 | Miller | B63B 1/042 |
| | | | 114/288 |
| 5,746,146 A | 5/1998 | Bixel, Jr. | |
| 6,250,245 B1 | 6/2001 | Robinson et al. | |
| 6,526,903 B2 | 3/2003 | Robinson et al. | |
| 6,983,713 B1 | 1/2006 | Robinson et al. | |
| 7,093,553 B2 | 8/2006 | Robinson et al. | |
| 7,305,926 B2 | 12/2007 | Seider | |
| D595,204 S | 6/2009 | Robinson et al. | |
| 8,590,475 B2 | 11/2013 | Viviani et al. | |
| 8,726,823 B2 | 5/2014 | Kristinsson | |
| D709,023 S | 7/2014 | Viviani et al. | |
| D718,209 S | 11/2014 | Kristinsson | |
| D718,210 S | 11/2014 | Kristinsson | |
| D718,211 S | 11/2014 | Kristinsson | |
| D721,319 S | 1/2015 | Kristinsson | |
| D721,632 S | 1/2015 | Kristinsson | |
| D721,633 S | 1/2015 | Kristinsson | |
| 9,242,700 B1 | 1/2016 | Viviani et al. | |
| 9,517,813 B2 | 12/2016 | Hotary et al. | |
| 2004/0129192 A1* | 7/2004 | Guerard | B63B 1/042 |
| | | | 114/61.33 |
| 2007/0266921 A1* | 11/2007 | Brady | B63B 1/12 |
| | | | 114/61.1 |
| 2009/0056612 A1* | 3/2009 | Yap | B63B 1/322 |
| | | | 114/273 |
| 2012/0291686 A1* | 11/2012 | Loui | B63B 1/042 |
| | | | 114/61.2 |

FOREIGN PATENT DOCUMENTS

| | | |
|---|---|---|
| NL | 9100231 A | 9/1992 |
| WO | WO2015/010377 A1 | 1/2015 |

* cited by examiner

BOAT HULL

FIELD OF THE INVENTION

The invention broadly relates to boat hulls, more specifically to boat hulls designed to minimize the formation of a wake, and even more particularly to a boat hull designed to minimize the formation of a wake while also minimizing cavitation. The present boat hull is an improved hybrid hull form for mono-hull planing vessels having characteristics of both inverted V bottom and conventional V bottom hull forms.

BACKGROUND OF THE INVENTION

The inverted V bottom hull form, commonly known as a sea sled, was invented by Albert Hickman. The original hull form consisted of a rectangular hull platform with an inverted V section at the bow, with the V section becoming continuously and progressively shallower toward the stern until disappearing or nearly disappearing at the transom. The Hickman hull form has been recognized as one of the most efficient non-stepped planing hull forms having the ability to carry as much as eighty pounds per horsepower at planing speeds. Inverted V hulls capture bow waves which are normally deflected outboard and away from the hull and redirects the wave under the hull. This volume of captured water allows the boat to rise further out of the water at planing speeds thereby reducing resistance and consuming less energy. Moreover, the captured wake is filled with air, and aerated water being less dense than solid water, cushions the hull during further impacts with oncoming waves, making the Hickman hull ideal for rough water use. Additionally, inverted V hulls, having parallel sides and deep chines, exhibit great directional stability. Still yet further, the draft of a Hickman hull is less than most conventional hull forms, making it useful in shallow waters. Lastly, the hull's generally rectangular platform resulting from the wide forward sections makes the boat stable at all operating speeds.

Despite the foregoing, inverted V hulls exhibit several undesirable characteristics which various design modifications have attempted to minimize. For example, long parallel chines act like runners on a sled thereby making turning the boat extremely difficult. Moreover, aerated water under the hull is directed towards the center of the hull and exits at the transom flowing directly into the propeller which causes the propeller to cavitate. Typically, boats turning at high speed bank, or heel, toward the inside of the turn, however boats using the Hickman hull remain flat or heel towards the outside of the turn. The foregoing is unsettling to the crew, and a higher center of gravity of the hull structure combined with the centrifugal force generated during the turn can capsize the boat. The lack of heel in a turn combined with the near vertical and straight fore and aft sides of a boat using this hull can cause a condition known as "tripping over the chine", where during a sliding turn, the edge of the hull strikes a wave, the chine catches on the water and the boat trips over the chine, rapidly tipping or flipping the boat athwartships. Furthermore, the inverted V section greatly reduces the depth of the hull along the centerline of the boat amidships and forward thereby reducing the useable internal volume of the boat and raising the center of gravity of the hull.

Planing hulls are well known in the art of boat hull design. The vast majority of hull forms used in planing boats have sectional shapes that are either rectangular, V shaped, round shaped, or combinations thereof. Generally, hulls using these shapes have a common aspect, i.e., the keel is lower than the chine or turn of the bilge. The dimensional characteristics of the hull, e.g., displacement, deadrise, strake and chine placement, cross-sectional shape, and longitudinal curvature, vary greatly and can be combined in endless variations. These features affect the ride qualities, top speed, maneuverability and horsepower requirements of a vessel to achieve a planing speed.

Planing round or V bottom hull types possess several undesirable design traits. For example, there is a tendency to squat, i.e., the stern sinks and the bow rises, when transitioning from operating in a displacement mode (slow speed) to a planing mode (higher speed). In a displacement mode, the hull is buoyed up by the displaced volume of water equal to the volume of the immersed hull at rest. In a planing mode, the hull is lifted up by the hydrostatic forces generated by the hull striking the water at high speed, at some angle of attack, which in turn causes the hull to skim across the surface of the water. During this transitional speed, i.e., the changing between displacement and planing modes where the boat has to "climb" over its own bow wave, the boat is less stable, hard to steer, and forward visibility is often dangerously reduced. Another unfavorable characteristic is the tendency to generate a large bow wave which, when piercing oncoming waves and water, causes this wave to fly outboard and upward, and potentially landing on the boat. Still yet another problem is the direct relationship between ride quality and required horsepower, i.e., deeper sections and greater deadrise result in a softer ride but greatly increase the horsepower requirements. Yet another issue is the reduced stability of the boat while operating below planing speeds. Conventional hulls with moderate deadrise are unstable when beached and make approaching the shore difficult due to their deeper draft.

Known boat hull forms incorporate various stepped chines, stepped hull sections, tunnels and various shaped cavities all of which have abrupt changes in the surface contour and may have angular edges and corners, often sharp and whose included angle approach 90 degrees. Angular discontinuities in the hull surface require substantial structural bracing and reinforcement to keep the hull bottom from flexing and cracking at these transitions. When these features are employed the resulting hull is specifically optimized to operate at certain speeds since water does not like to flow into or across sharp edges, which typically creates turbulence and/or drag, unless traveling at high speeds and traveling in a precisely controlled direction. Water flow can only be predicted and controlled when a vessel is operating on a smooth body of water.

There are yet other hull forms used on planing powerboat hulls. Examples of these hulls include hulls that exhibit traits known in the industry as tri-hulls, tunnel hulls, catamarans, and hybrid hulls that combine some or all of these forms. Catamarans and various tunnel hulls have the greatest stability due to their displaced volume being in two hulls spaced apart and interconnected, and an applied heeling force results in the greatest shift in the center of buoyancy and the largest righting moment. They typically are very fast requiring less energy to power them; however, they are harder to steer, lack useable internal volume, can pound in a seaway, and often are more complicated to construct. Tri-hull boats became exceedingly popular in the 1970's due to their useable internal volume and great stability at plane or at rest. Such hulls incorporate a central main hull running the full length of the boat and sponsons or smaller hull like appendages outboard and fully integrated with the main hull, intended to capture the bow wave. As newer hybrid combinations of the alternative hull forms were discovered the tri-hull virtually disappeared due to its reputation for severe pounding in anything but smooth water as well as the increased power needed to propel the craft. For example, the increased form drag caused by the added drag of the tri-hulls' sponsons, in addition to its increased hull mass due to added surface area, requires more power to propel the craft.

Numerous attempts have been made to combine the features and characteristics of the various possible cross-sectional hull forms in order to optimize handling, ride, power requirements, useable volume, stability, and any of the aforementioned desirable traits of the various shapes. However, no hull design has successfully improved the power requirements, ride and handling characteristics of mono-hull designs as set forth herebelow in the detailed description of various embodiments of the present invention.

The various hull designs known in the art all possess some shortcomings that detract from the boating experience. For example, known V hull designs are incapable of using trapped air and contained bow waves to reduce slamming while also increasing efficiency. In fact, some hull designs force air towards the center of the hull, inwardly toward the propeller, thereby causing cavitation and steering issues. This, as well as other drawbacks of known hull designs, have presented a long felt need for a hull design that improves the boating experience, while maintaining safety, minimizing wakes, etc.

BRIEF SUMMARY OF THE INVENTION

The present invention broadly comprises a hybrid hull form for mono-hull planing vessels which provides optimal speed and handling characteristics. In various embodiments, the hull form comprises the combined features of an inverted V or concave hull forward and a convex or V section hull aft, with the areas inboard of a continuous chine being generally concave and highly shaped to guide and divert water and energy trapped in the concave forward sections down, aft, and gradually outboard to exit either side of the centerline, i.e., away from the propellers. The generally rectangular deck plan shape, combined with the concave forward sections, create the required cavity under the hull to effectively trap large volumes of air and water which lifts the hull at speed while reducing friction. The trapped aerated water is less dense than solid water which cushions the ride in rough conditions.

The present invention broadly comprises a boat hull. The boat hull includes a bow, a stern, a starboard side having a starboard chine and a starboard gunwale, a port side having a port chine and a port gunwale, a hull center line, and a bottom surface formed between the bow, the stern, the starboard chine and the port chine. The bottom surface includes first, second and third portions. The first portion is proximate the bow and includes a first concave surface and a second concave surface, the first concave surface projects from the hull center line towards the starboard chine and the second concave surface projects from the hull center line towards the port chine. The second portion is proximate the stern and includes a first convex surface and a second convex surface, the first convex surface projects from the hull center line toward the starboard chine and the second convex surface projects from the hull center line toward the port chine. The third portion is located between the first portion and the second portion and includes a third concave surface and a fourth concave surface, the third concave surface is between the hull center line and the starboard chine and the fourth concave surface is between the hull center line and the port chine. A distance between the starboard gunwale and the starboard chine is a starboard chine height, a distance between the port gunwale and the port chine is a port chine height, and a distance between the hull center line and a surface formed between the starboard gunwale and the port gunwale is a hull center line height. The starboard chine height and the port chine height are greater than the hull center line height between the bow and about one third of a distance from the bow to the stern.

The present invention also broadly comprises a boat hull. The boat hull includes a bow, a stern, a starboard side having a starboard chine and a starboard gunwale, a port side having a port chine and a port gunwale, a hull center line, and a bottom surface formed between the bow, the stern, the starboard chine and the port chine. The bottom surface includes first, second and third portions. The first portion is proximate the bow and includes a first warped planar surface and a second warped planar surface, the first warped planar surface projects from the hull center line downwardly towards the starboard chine and the second warped planar surface projects from the hull center line downwardly towards the port chine. The second portion is proximate the stern and includes a third warped planar surface and a fourth warped planar surface, the third warped planar surface projects from the hull center line upwardly toward the starboard chine and the fourth warped planar surface projects from the hull center line upwardly toward the port chine. The third portion is located between the first portion and the second portion and includes a fifth warped planar surface, a sixth warped planar surface, a seventh warped planar surface, and an eighth warped planar surface, the fifth warped planar surface and the sixth warped planar surface are between the hull center line and the starboard chine, the seventh warped planar surface and the eighth warped planar surface are between the hull center line and the port chine, the fifth warped planar surface projects from the hull center line upwardly towards a first transition, the sixth warped planar surface projects from the first transition downwardly towards the starboard chine, the seventh warped planar surface projects from the hull center line upwardly towards a second transition, and the eighth warped planar surface projects from the second transition downwardly towards the port chine. A distance between the starboard gunwale and the starboard chine is a starboard chine height, a distance between the port gunwale and the port chine is a port chine height, and a distance between the hull center line and a surface formed between the starboard gunwale and the port gunwale is a hull center line height. The starboard chine height and the port chine height are greater than the hull center line height between the bow and about one third of a distance from the bow to the stern.

It is an object of the present invention to provide a hybrid hull form design having smooth flowing lines which results in a hull that is easily built, and includes a contoured bottom shape that is inherently rigid, stiff and strong, and is highly efficient.

It is another object of the invention that the substantially parallel chines, in some embodiments, act like rails providing directional stability in all conditions, as well as preventing yaw or bow steering in a following sea. The deep chines included in some embodiments prevent water from flying up and outboard, and from spraying the occupants as is typical on conventional V bottom vessels. The deep chines, being below the hull center line near the bow, allow the boat to be easily beached while preventing side to side rocking during disembarkment. It should be appreciated that the substantially rectangular deck plan combined with deep outer chines and near vertical hull sides places the volume of the hull further outboard thereby creating more static and dynamic stability than more conventional V bottom hull forms.

It is another object of the invention to create a hull with geometry that delays the onset of or minimizes the effects of porpoising, e.g., repeated pitching oscillation of a bow of a vessel. In some embodiments of the present hull design, some of the lifting surface on which the hull planes is provided from the portion falling about 40% aft of the stern, ahead of and detached from the principal lifting surface further aft. As the boat speed increases, the area of hull in contact with the water decreases, the hull rises higher and the center of pressure moves aft. When the center of pressure moves aft of the center of gravity of the hull, the hull falls forward and porpoising begins. The deep chines located at about 30% aft of the stern, present in some embodiments, then reestablish contact with the water as the hull pitches forward. This chine area then provides dynamic lift, immediately moving the center of pressure forward which in turn eliminates, reduces the period of, or softens the slamming force of the hull porpoising.

It is another object of the invention to provide a hull, which employs forward hull sections with inverted V or concave sections, that easily turns and comfortably and safely banks inboard during a high-speed turn.

It is another object of the invention to provide a hull with great load carrying ability while planing, with minimal power due in part to the entrapped air and bow wave capturing. The same entrapped air and water provides the further benefit of reducing slamming forces in rough waters.

It is another object of the invention to provide a hull which transitions to planing at very low speeds with minimal horsepower, without the normal squatting of the stern and rising of the bow while transitioning to planing. For example, the measured rise during the transition to planing may be only about three (3) to five (5) degrees.

It is another object of the present invention to provide a hybrid boat hull form whose center of buoyancy is inherently further aft than is possible in a conventional hull typically having sections of fairly constant deadrise. The foregoing aspect permits supporting multiple outboard motors and their weight without having to employ below the water transom extensions to support the weight of the motors while the vessel is at rest.

It is another object of the present invention to provide a boat hull that includes structures projecting downwardly from the bow/stern area of the hull used to pierce, disrupt, aerate and reduce the water density of oncoming waves prior to the same reaching the hull.

In some embodiments, the present invention combines a convex or V section aft of where the hull center line is below the chine with an inverted V or concave hull forward. The convex or V section includes more aft convex sections extending forward from the transom that remains convex or V shaped in section while the hull center line remains below the chines until reaching a point generally 30-50 percent of the hull length aft of the bow. Alternatively, the convex section may taper in width significantly to about ⅓ the length of the boat aft of the bow. The blending surfaces between the chine and the narrowing convex sections, in combination with the shallowing concave bow section results in an aggressively concave surface which flattens and becomes narrower as it moves aft and outboard, eventually disappearing completely before the transom.

It must be appreciated that the relative size and shape of a vessel built in accordance with the present hull form may vary depending on overall design characteristics without departing from the scope of the claims recited below. In some embodiments the deadrise of the V sections or curvature of the convex sections aft might become deeper than depicted, the hull center line being proportionally deeper relative to the chine, varying with the required displacement and beam/length ratio and desired top speed. In some embodiments, the chines forward may be deeper relative to the hull center line such that they remain in contact with the water longer at high speed. In such embodiments, the hull will resemble a three-point hydroplane arrangement.

It is understood that surface lifting strakes, spray deflectors, stepped hulls, stepped sections and elements such as ventilated chines could be added to the present hull form without departing from the scope of the claims recited below.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

Figure 1:
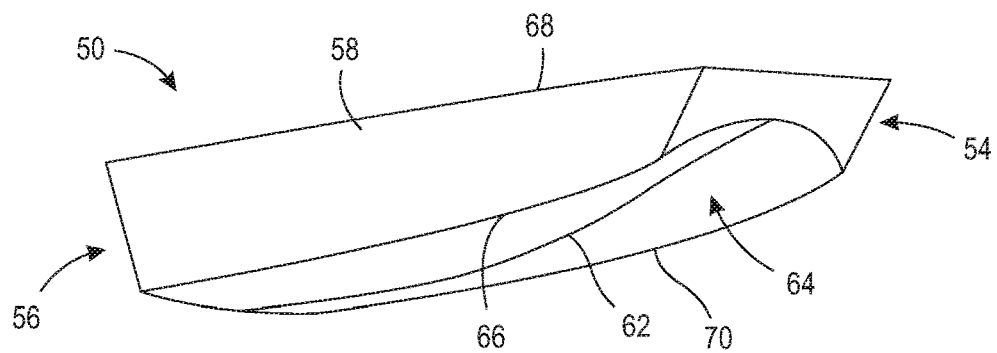
FIG. 1 is a front side perspective view of an embodiment of a present boat hull.
Figure 2:
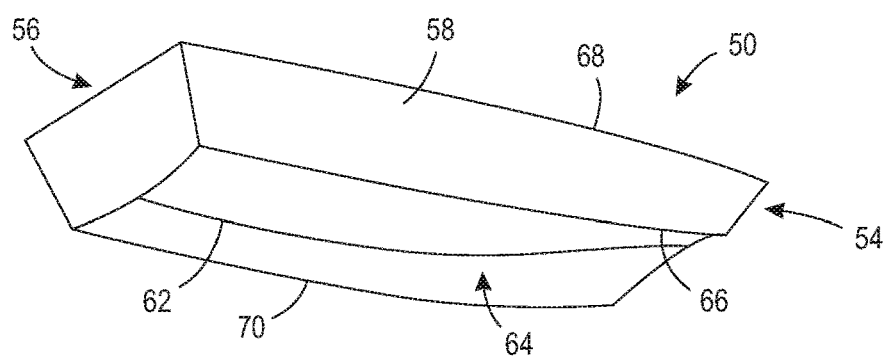
FIG. 2 is a back side perspective view of an embodiment of a present boat hull.
Figure 3:
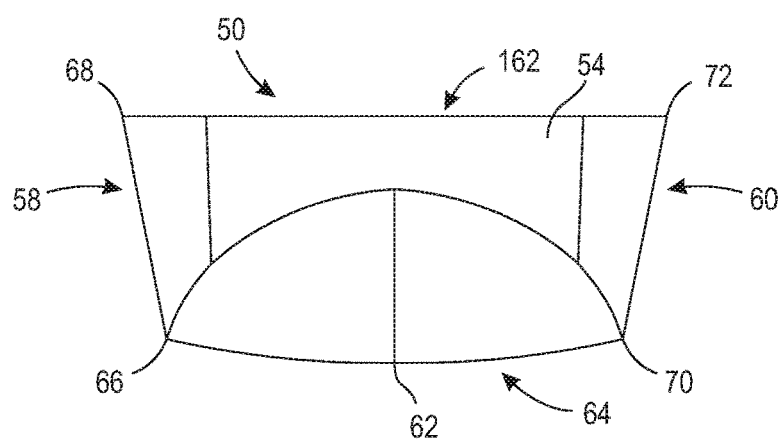
FIG. 3 is a front elevational view of an embodiment of a present boat hull.
Figure 4:
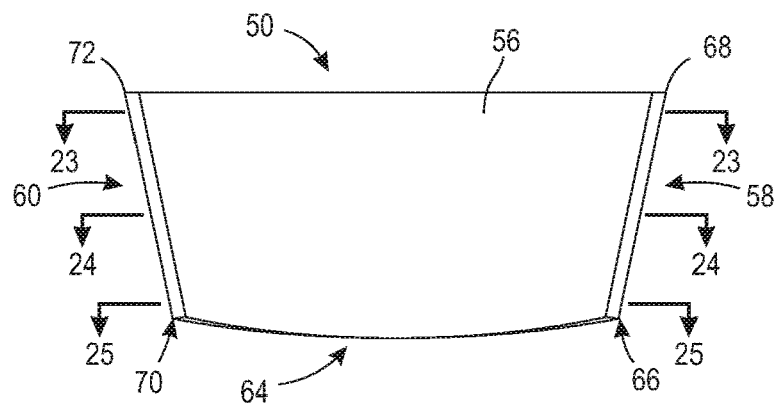
FIG. 4 is a back elevational view of an embodiment of a present boat hull.
Figure 5:
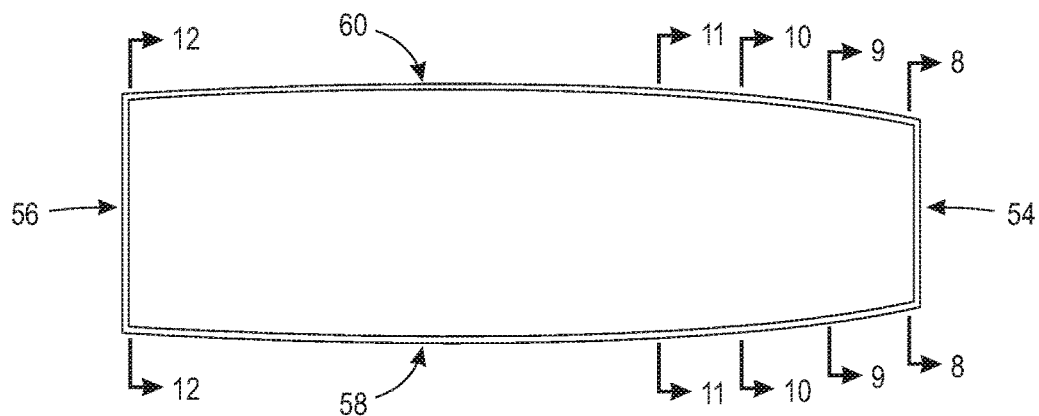
FIG. 5 is a top plan view of an embodiment of a present boat hull.
Figure 6:
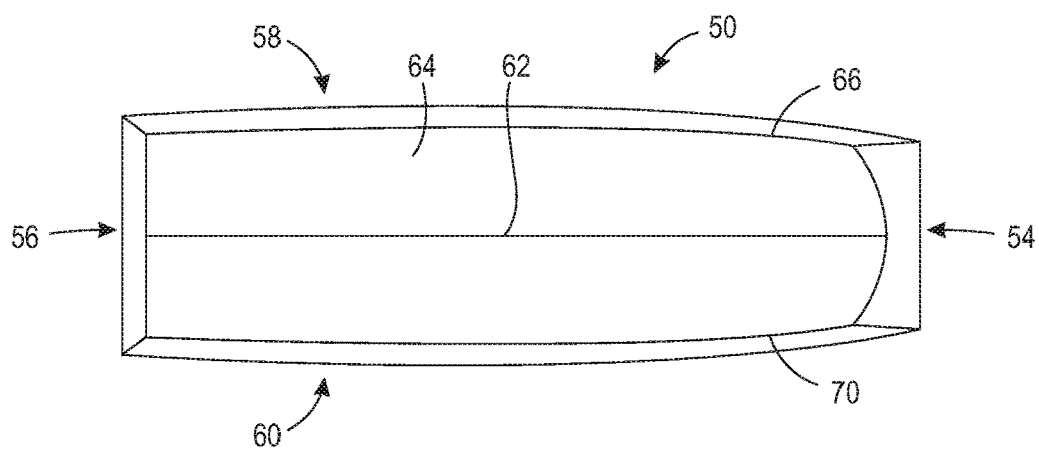
FIG. 6 is a bottom plan view of an embodiment of a present boat hull.
Figure 7:
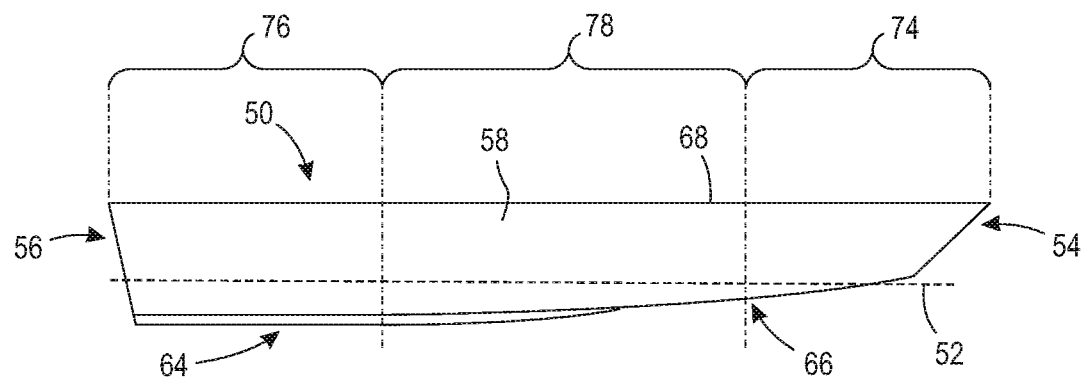
FIG. 7 is a side elevational view of an embodiment of a present boat hull.

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodologies, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Moreover, as used herein, the phrases "comprises at least one of" and "comprising at least one of" in combination with a system or element are intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of" is used herein. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. As used herein, "about" is intended to mean a value that is plus or minus ten percent (10%) of the associated valued.

Although any methods, devices or materials similar or equivalent to those described herein can be used in the practice or testing of the invention, the preferred methods, devices, and materials are now described.

Adverting now to the figures, FIGS. 1-33 depict various embodiments of boat hulls falling within the scope of the claims recited below. Each boat hull, e.g., boat hull 50, includes a design water line 52. It should be appreciated that a design water line is the elevational height on a hull where the surface of the water falls when the hull is loaded to its design capacity and at rest. Boat hull 50 comprises bow 54, stern 56, starboard side 58, port side 60, hull center line 62 and bottom surface 64. Starboard side 58 comprises starboard chine 66 and starboard gunwale 68, while port side 60 comprises port chine 70 and port gunwale 72. Bottom surface 64 is formed between bow 54, stern 56, starboard chine 66 and port chine 70. Bottom surface 64 comprises first, second and third portions 74, 76 and 78, respectively. First portion 74 is proximate bow 54 and comprises first concave surface 80 and second concave surface 82. First concave surface 80 projects from hull center line 62 towards starboard chine 66 and second concave surface 82 projects from hull center line 62 towards port chine 70. Second portion 76 is proximate stern 56 and comprises first convex surface 84 and second convex surface 86. First convex surface 84 projects from hull center line 62 toward starboard chine 66 and second convex surface 86 projects from hull center line 62 toward port chine 70. Third portion 78 is located between first portion 74 and second portion 76 and comprises third concave surface 88 and fourth concave surface 90. Third concave surface 88 is between hull center line 62 and starboard chine 66 and fourth concave surface 90 is between hull center line 62 and port chine 70.

Figure 8:
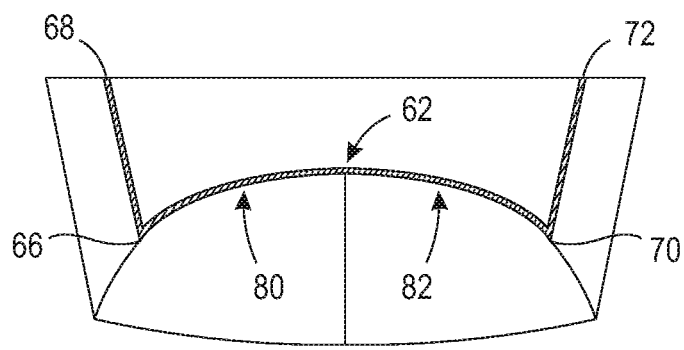
FIG. 8 is a cross section of an embodiment of a present boat hull taken along Line 8-8 of FIG. 5.
Figure 9:
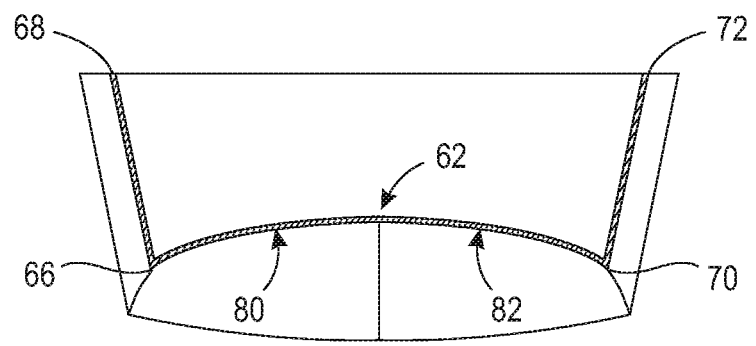
FIG. 9 is a cross section of an embodiment of a present boat hull taken along Line 9-9 of FIG. 5.
Figure 10:
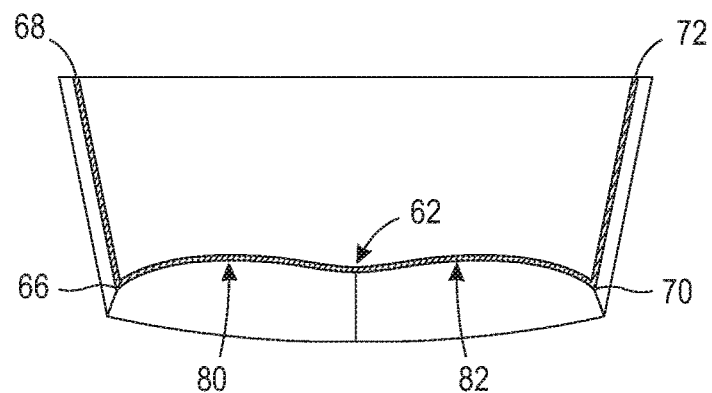
FIG. 10 is a cross section of an embodiment of a present boat hull taken along Line 10-10 of FIG. 5.

In some embodiments, first concave surface 80 is formed between hull center line 62 and starboard chine 66 and second concave surface 82 is formed between hull center line 62 and port chine 70. In other terms, first concave surface 80 is a continuous concave surface between hull center line 62 and starboard chine 66 while second concave surface 82 is a continuous concave surface between hull center line 62 and port chine 70. In some embodiments, a discontinuity between first concave surface 80 and second concave surface 82 is present at hull center line 62, e.g., as depicted in FIG. 10, while in other embodiments, first concave surface 80 transitions to second concave surface 82 at hull center line 62 without any discontinuity, e.g., as depicted in FIGS. 8 and 9.

In some embodiments, first portion 74 further comprises starboard inflection 92, port inflection 94, first surface 96 and second surface 98. Starboard inflection 92 and port inflection 94 are outboard relative to hull center line 62. First surface 96 is located between starboard inflection 92 and starboard chine 66, while second surface 98 is located between port inflection 94 and port chine 70.

In some embodiments, first surface 96 and second surface 98 are warped planar surfaces, e.g., warped planar surfaces 100 and 102, respectively, while in other embodiments, first surface 96 and second surface 98 are convex surfaces, e.g., convex surfaces 104 and 106, respectively. It should be appreciated that warped planar surfaces, when viewed in cross-section appear as a straight line, however when viewed in three dimensions appear as a twisted or bent planar surface. Moreover, in some embodiments, convex surfaces 104 and 106, when viewed in cross-section appear as a convex line, however when viewed in three dimensions appear as a twisted or bent plane having a convex cross-section.

Figure 12:
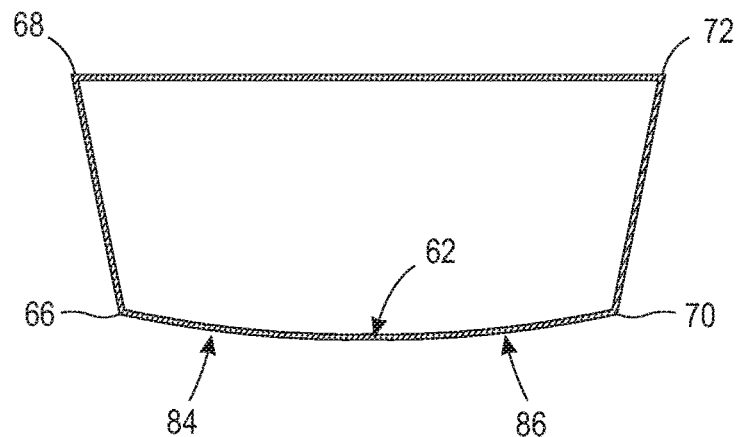
FIG. 12 is a cross section of an embodiment of a present boat hull taken along Line 12-12 of FIG. 5.
Figure 13:
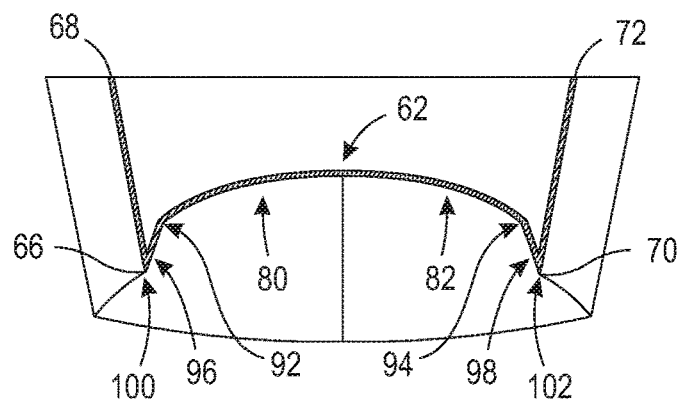
FIG. 13 is a cross section of an embodiment of a present boat hull similar to the cross section depicted in FIG. 8.
Figure 14:
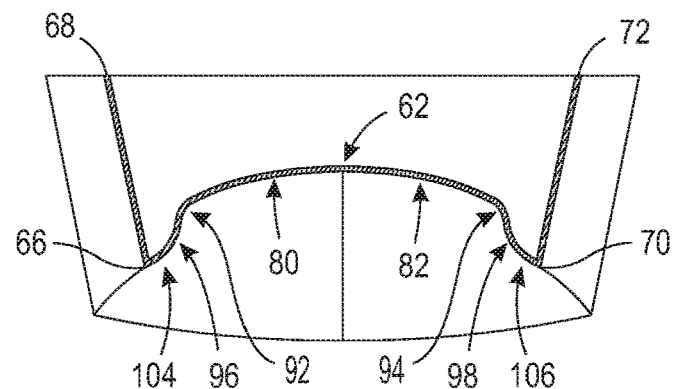
FIG. 14 is a cross section of an embodiment of a present boat hull similar to the cross section depicted in FIG. 8.
Figure 15:
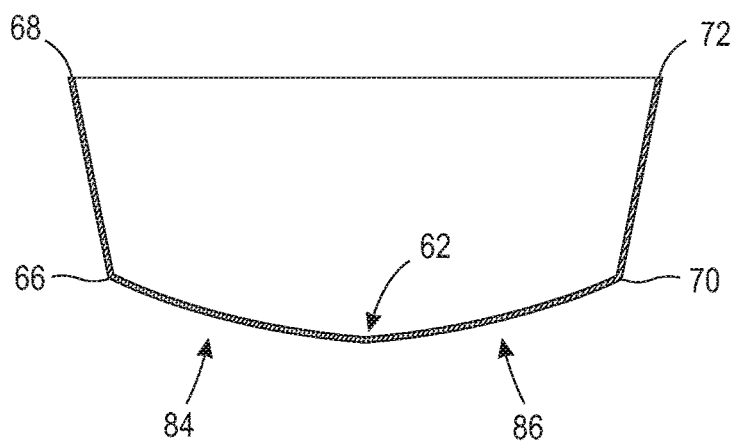
FIG. 15 is a cross section of an embodiment of a present boat hull similar to the cross section depicted in FIG. 12.
Figure 16:
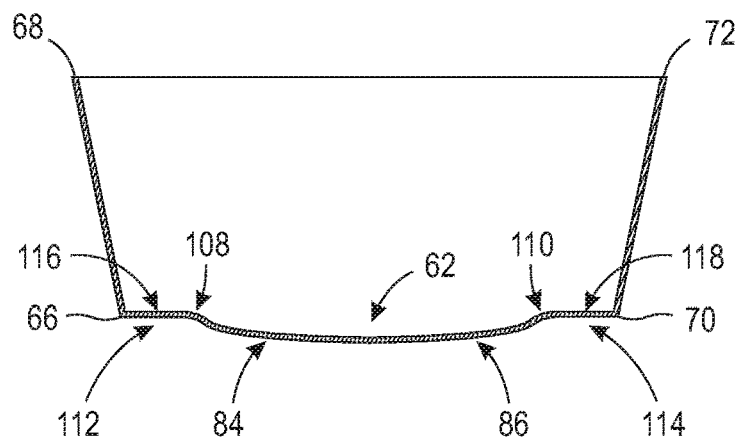
FIG. 16 is a cross section of an embodiment of a present boat hull similar to the cross section depicted in FIG. 12.
Figure 17:
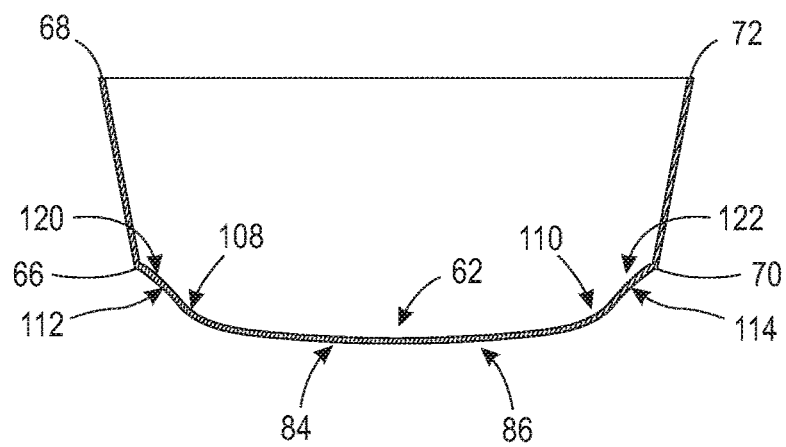
FIG. 17 is a cross section of an embodiment of a present boat hull similar to the cross section depicted in FIG. 12.

In some embodiments, first convex surface 84 is formed between hull center line 62 and starboard chine 66 and second convex surface 86 is formed between hull center line 62 and port chine 70. In other terms, first convex surface 84 is a continuous convex surface between hull center line 62 and starboard chine 66 while second convex surface 86 is a continuous convex surface between hull center line 62 and port chine 70. In some embodiments, a discontinuity between first convex surface 84 and second convex surface 86 is present at hull center line 62, e.g., as depicted in FIG. 15, while in other embodiments, first convex surface 84 transitions to second convex surface 86 at hull center line 62 without any discontinuity, e.g., as depicted in FIG. 12.

In some embodiments, second portion 76 further comprises starboard inflection 108, port inflection 110, first surface 112 and second surface 114. Starboard inflection 108 and port inflection 110 are outboard relative to hull center line 62. First surface 112 is between starboard inflection 108 and starboard chine 66, while second surface 114 is between port inflection 110 and port chine 70.

In some embodiments, first surface 112 and second surface 114 are warped planar surfaces, e.g., warped planar surfaces 116 and 118, respectively, while in other embodiments, first surface 112 and second surface 114 are concave surfaces, e.g., concave surfaces 120 and 122, respectively. It should be appreciated that warped planar surfaces, when viewed in cross-section appear as a straight line, however when viewed in three dimensions appear as a twisted or bent planar surface. Moreover, in some embodiments, concave surfaces 120 and 122, when viewed in cross-section appear as a concave line, however when viewed in three dimensions appear as a twisted or bent plane having a concave cross-section.

Figure 11:
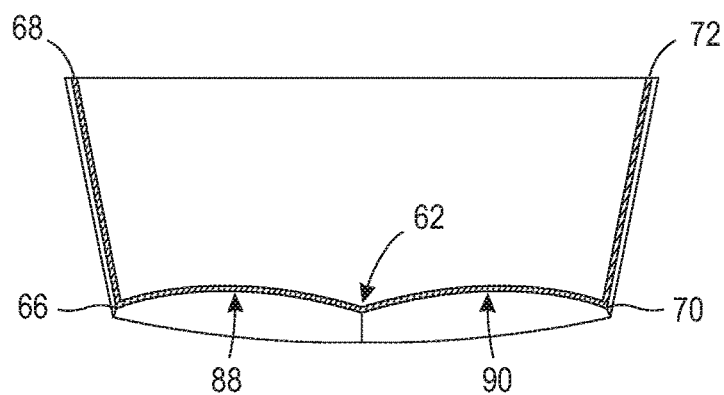
FIG. 11 is a cross section of an embodiment of a present boat hull taken along Line 11-11 of FIG. 5.
Figure 18:
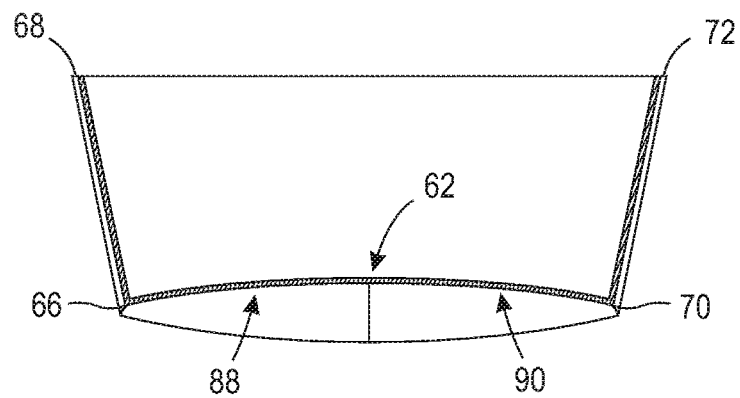
FIG. 18 is a cross section of an embodiment of a present boat hull similar to the cross section depicted in FIG. 11.
Figure 19:
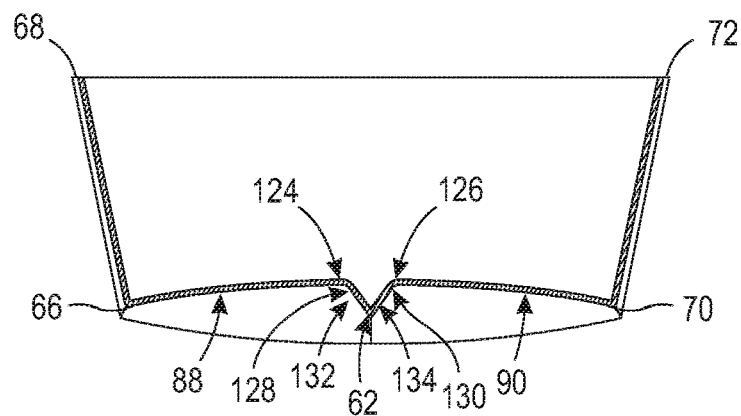
FIG. 19 is a cross section of an embodiment of a present boat hull similar to the cross section depicted in FIG. 11.
Figure 20:
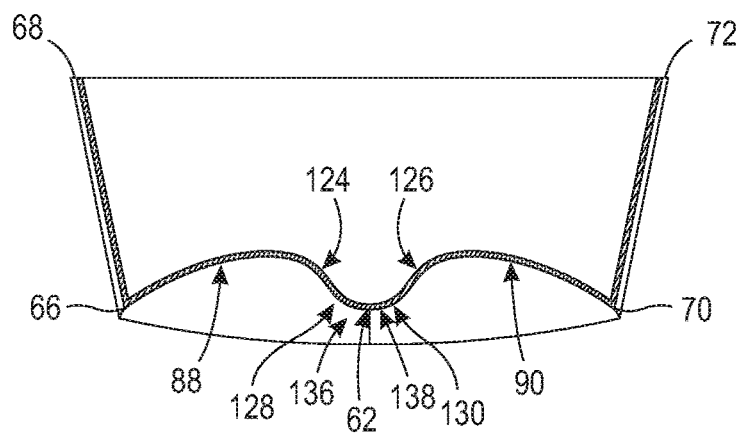
FIG. 20 is a cross section of an embodiment of a present boat hull similar to the cross section depicted in FIG. 11.
Figure 21:
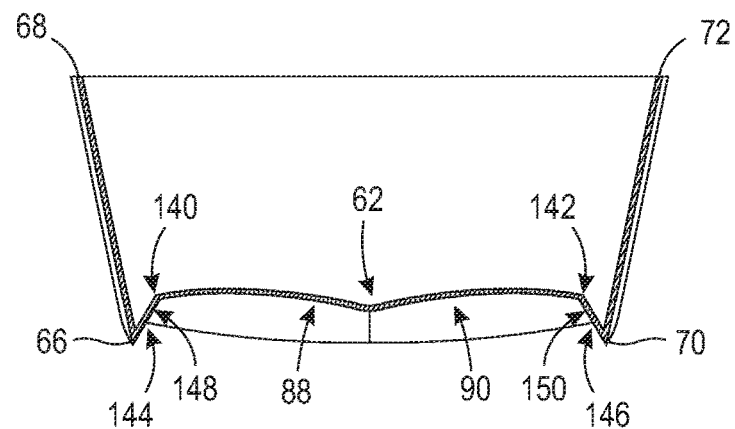
FIG. 21 is a cross section of an embodiment of a present boat hull similar to the cross section depicted in FIG. 11.
Figure 22:
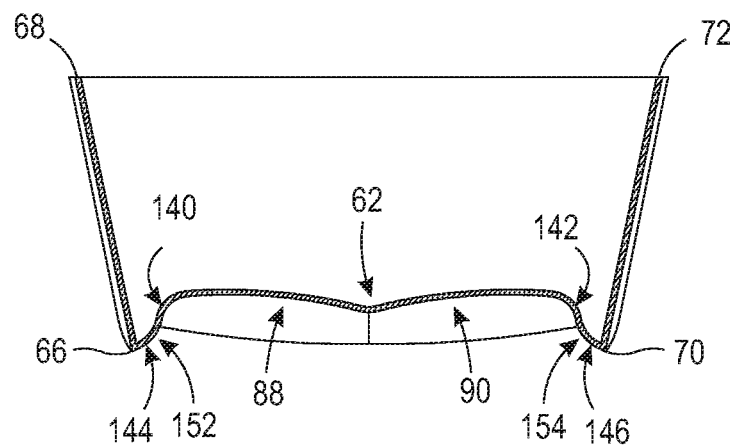
FIG. 22 is a cross section of an embodiment of a present boat hull similar to the cross section depicted in FIG. 11.
Figure 23:
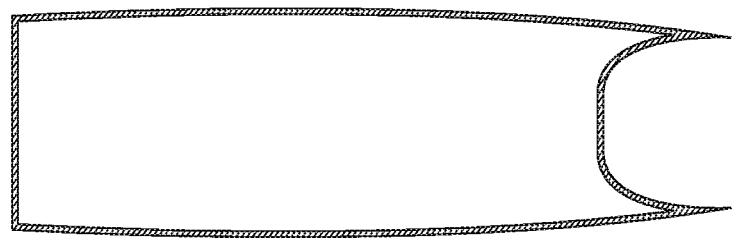
FIG. 23 is a cross section of an embodiment of a present boat hull taken along Line 23-23 of FIG. 4.
Figure 24:
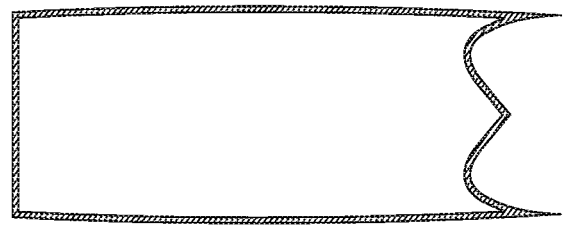
FIG. 24 is a cross section of an embodiment of a present boat hull taken along Line 24-24 of FIG. 4.
Figure 25:
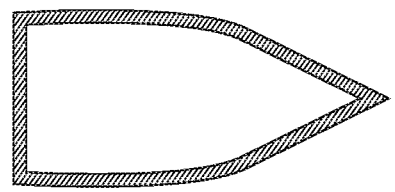
FIG. 25 is a cross section of an embodiment of a present boat hull taken along Line 25-25 of FIG. 4.
Figure 26:
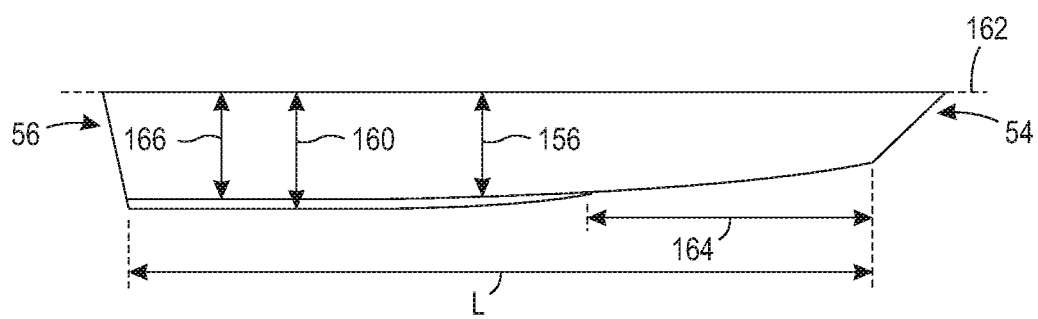
FIG. 26 is a side elevational view of an embodiment of a present boat hull.
Figure 27:
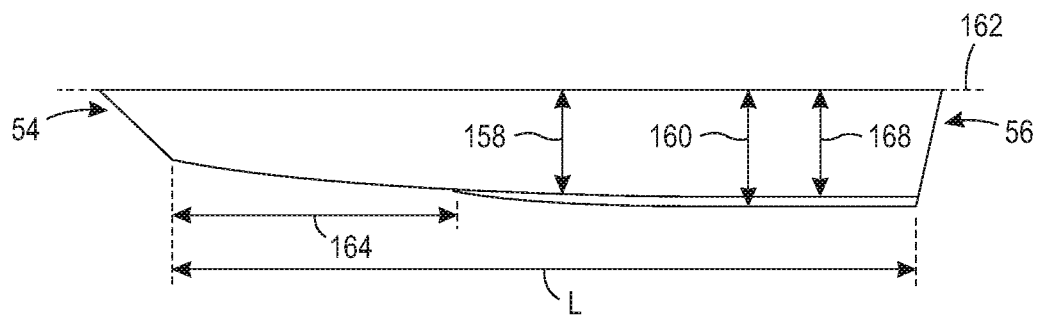
FIG. 27 is a side elevational view of an embodiment of a present boat hull.
Figure 28:
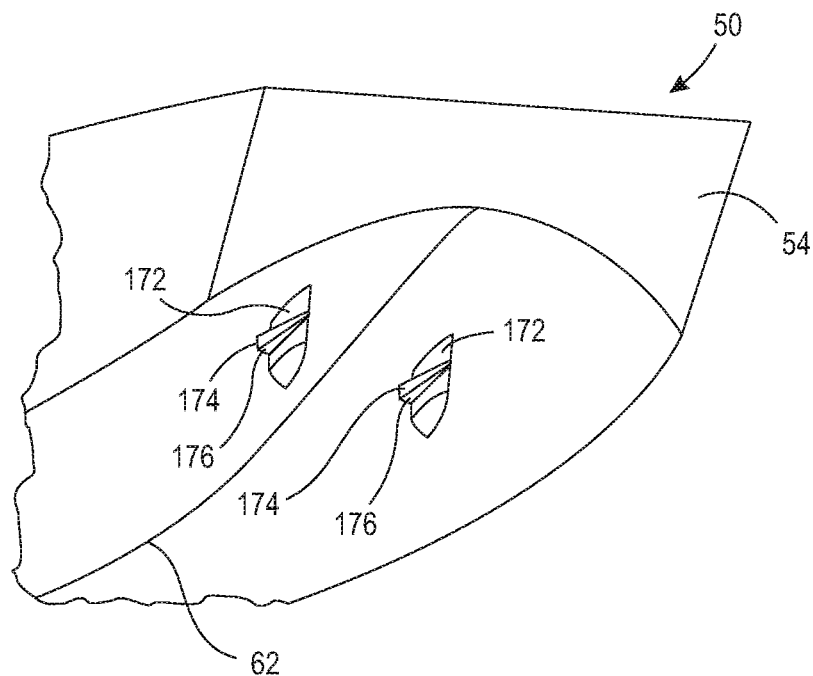
FIG. 28 is a partial front perspective view of an embodiment of a present boat hull including wave piercing structures.
Figure 29:
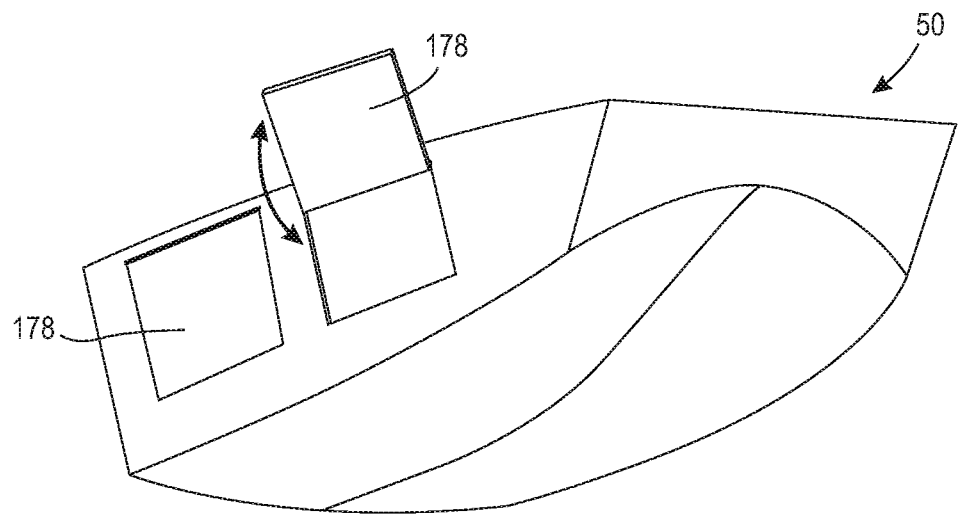
FIG. 29 is a front perspective view of an embodiment of a present boat hull including hinged side elements.
Figure 30:
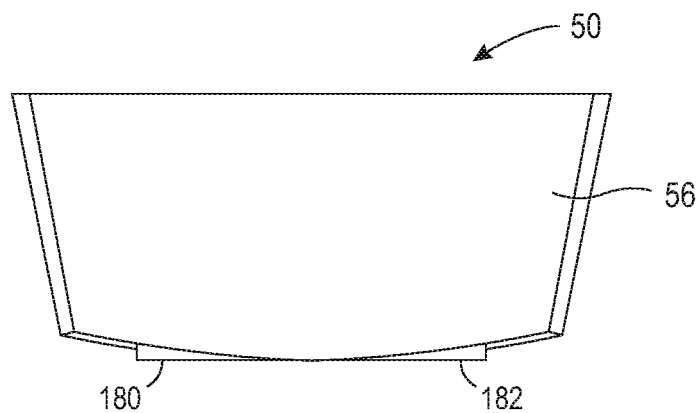
FIG. 30 is a back elevational view of an embodiment of a present boat hull including a plurality of strakes projecting therefrom.
Figure 31:
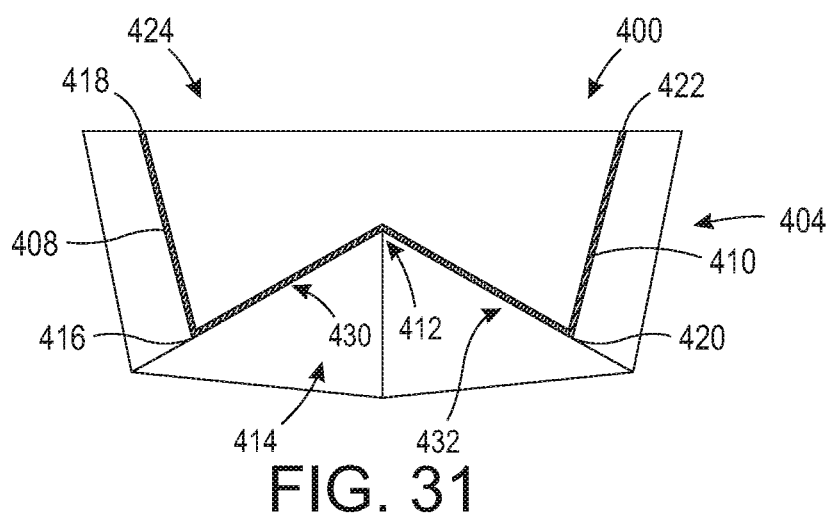
FIG. 31 is a cross section of an embodiment of a present boat hull similar to the cross section depicted in FIG. 8.
Figure 32:
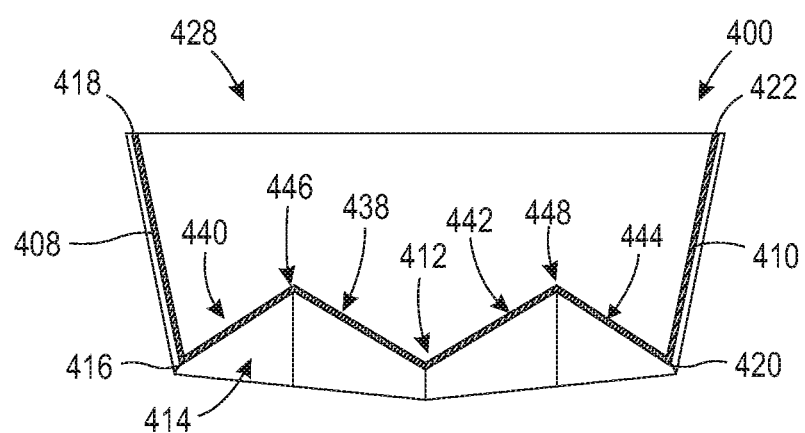
FIG. 32 is a cross section of an embodiment of a present boat hull similar to the cross section depicted in FIG. 11.
Figure 33:
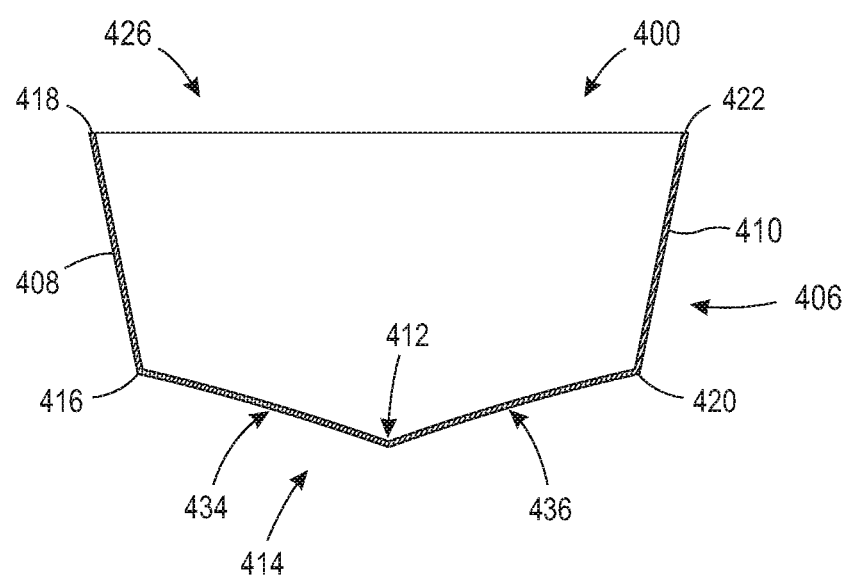
FIG. 33 is a cross section of an embodiment of a present boat hull similar to the cross section depicted in FIG. 12; and, FIG. 34 is a side elevational view of an embodiment of a present boat hull.
Figure 34:
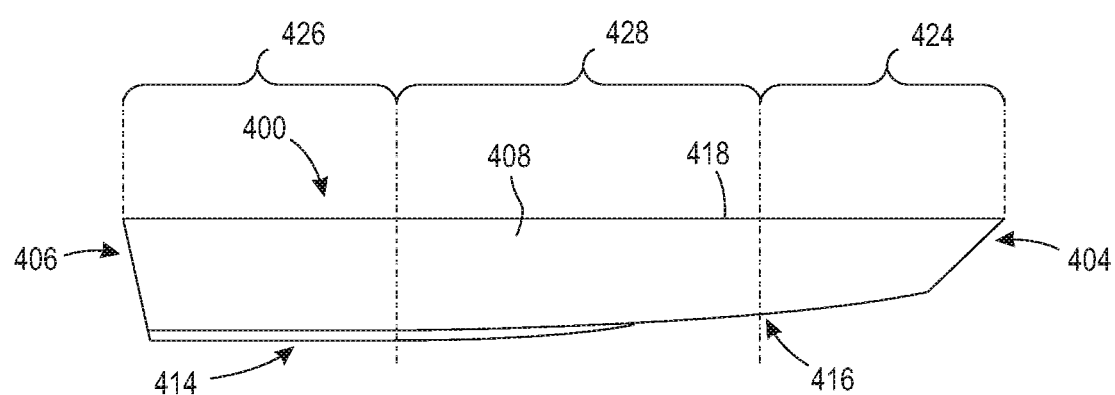

In some embodiments, third concave surface 88 is formed between hull center line 62 and starboard chine 66 and fourth concave surface 90 is formed between hull center line 62 and port chine 70. In other terms, third concave surface 88 is a continuous concave surface between hull center line 62 and starboard chine 66 while fourth concave surface 90 is a continuous concave surface between hull center line 62 and port chine 70. In some embodiments, a discontinuity between third concave surface 88 and fourth concave surface 90 is present at hull center line 62, e.g., as depicted in FIG. 11, while in other embodiments, third concave surface 88 transitions to fourth concave surface 90 at hull center line 62 without any discontinuity, e.g., as depicted in FIG. 18.

In some embodiments, third portion 78 further comprises starboard inflection 124, port inflection 126, first surface 128 and second surface 130. Starboard inflection 124 and port inflection 126 are outboard relative to hull center line 62. First surface 128 is between starboard inflection 124, while second surface 130 is between hull center line 62 and port inflection 126.

In some embodiments, first surface 128 and second surface 130 are warped planar surfaces, e.g., warped planar surfaces 132 and 134, respectively, while in other embodiments, first surface 128 and second surface 130 are concave surfaces, e.g., concave surfaces 136 and 138, respectively. It should be appreciated that warped planar surfaces, when viewed in cross-section appear as a straight line, however when viewed in three dimensions appear as a twisted or bent planar surface. Moreover, in some embodiments, concave surfaces 136 and 138, when viewed in cross-section appear as a concave line, however when viewed in three dimensions appear as a twisted or bent plane having a concave cross-section.

In some embodiments, third portion 78 further comprises starboard inflection 140, port inflection 142, first surface 144 and second surface 146. Starboard inflection 140 and port inflection 142 are outboard relative to hull center line 62. First surface 144 is between starboard inflection 140 and starboard chine 66, while second surface 146 is between port inflection 142 and port chine 70.

In some embodiments, first surface 144 and second surface 146 are warped planar surfaces, e.g., warped planar surfaces 148 and 150, respectively, while in other embodiments, first surface 144 and second surface 146 are concave surfaces, e.g., concave surfaces 152 and 154, respectively. It should be appreciated that warped planar surfaces, when viewed in cross-section appear as a straight line, however when viewed in three dimensions appear as a twisted or bent planar surface. Moreover, in some embodiments, concave surfaces 152 and 154, when viewed in cross-section appear as a concave line, however when viewed in three dimensions appear as a twisted or bent plane having a concave cross-section.

In some embodiments, second portion 76 is arranged to direct air and water moving from first portion 74 to second portion 76 towards starboard side 58 and port side 60 prior to moving past second portion 76. It should be appreciated that directing air and air entrained water outwardly improves the performance of a propeller positioned at the stern of a present invention hull as a propeller is more efficient when passing through water than air or air entrained water.

In some embodiments, hull 50 further comprises length L of bottom surface 64, i.e., the distance between bow 54 and stern 56. Starboard side 58 comprises starboard chine height 156 between starboard chine 66 and starboard gunwale 68, while port side 60 comprises port chine height 158 between port chine 70 and port gunwale 72. Hull center line 62 comprises hull center line height 160 between a surface formed between starboard gunwale 68 and port gunwale 72 and hull center line 62. In some embodiments, hull center line height 160 is greater than starboard chine height 156 and port chine height 158 between about one-third ($\frac{1}{3}$) of length L and stern 56. The foregoing relationship between starboard chine height 156, port chine height 158 and hull center line height 160 can be altered to affect the behavior of the present hull while tracking through water. For example, the transition point where hull center line height 160 becomes greater than starboard chine height 156 and port chine height 158 can be altered to make the hull respond differently during turning and during straight forward movement.

In other terms, in some embodiments, distance 156 between starboard gunwale 68 and starboard chine 66 is starboard chine height 156, while distance 158 between port gunwale 72 and port chine 70 is port chine height 158, and distance 160 between hull center line 62 and surface 162 formed between starboard gunwale 68 and port gunwale 72 is hull center line height 160. Starboard chine height 156 and port chine height 158 are greater than hull center line height 160 between bow 54 and about one third of the distance from bow 54 to stern 56, e.g., the distance represented by bi-directional arrow 164.

In some embodiments, first portion 74 transitions to third portion 78, and third portion 78 transitions to second portion 76 without a discontinuity. In other terms, the transition from first portion 74 to third portion 78 is a continuous surface while the transition from third portion 78 to second portion 76 is also a continuous surface. It has been found that the lack of discontinuity provides for more smooth planing of the present hull.

In some embodiments, a discontinuity is formed at hull center line 62 between at least one of: first concave surface 80 and second concave surface 82; first convex surface 84 and second convex surface 86; and, third concave surface 88 and fourth concave surface 90. In other terms, hull center line 62 may comprise an externally exposed keel, e.g., a central beam which contacts the water, from which the aforementioned surfaces project, alternatively may comprise a fully internally disposed keel, e.g., a central beam disposed fully within the hull and in contact with the water, from which the aforementioned surfaces project, or alternatively may be formed by other techniques known in the art of nautical design. It should be appreciated that the foregoing hull center line 62 arrangements fall within the scope of the claims below.

In some embodiments, starboard side 58 comprises starboard side maximum height 166 between starboard chine 66 and design water line 52, while port side 68 comprises port side maximum height 168 between port chine 70 and design water line 52. In these embodiments, starboard side maximum height 166 and port side maximum height 168 are adjacent stern 56.

In some embodiments, starboard side 58 comprises starboard side maximum height 166 between starboard chine 66 and design water line 52, while port side 68 comprises port side maximum height 168 between port chine 70 and design water line 52. In these embodiments, starboard side maximum height 166 and port side maximum height 168 are located between amidships 170 and bow 54.

In some embodiments, starboard side 58 comprises starboard side maximum height 166 between starboard chine 66 and design water line 52, while port side 68 comprises port side maximum height 168 between port chine 70 and design water line 52. In these embodiments, starboard side maximum height 166 and port side maximum height 168 are located between amidships 170 and stern 56.

It should be appreciated that the present hull may include other features that afford additional benefits to its performance, e.g., wave piercing structures. Typically, boats of all sizes employ a similar method to soften the ride of the vessel in wavy conditions, i.e., the bow is forced down to present a deeper V section and a sharper V shaped waterline, in plan view, to the oncoming waves. This is done by the use of trim tabs or adjusting the trim angle on an outboard motor. Boats fifteen feet and greater in length, including 60-80 feet yachts, are arranged in this fashion provided they operate in semi and full planing modes. However, at slower speeds, trim tabs have little effect to alter the fore and aft trim of a vessel. It should be appreciated that depressing the bow downward greatly slows the vessel, increases resistance, and creates a much larger bow wave. Depressing the bow creates a deeper and narrower water line plane reducing both static and dynamic stability.

It has been found that introducing structures projecting downwardly from the bow/stern area of the hull can be used to pierce, disrupt, aerate and reduce the water density of oncoming waves prior to the same reaching the hull. The reduced water density results in decreased impact force, reducing the amplitude of the rise of the bow, oscillations, etc., thereby providing improved ride conditions. In short, the gravitational force (G-force) experienced by users of the present hull is decreased. Moreover, the concave bow configuration of the present boat hull causes the exploded and disrupted oncoming wave energy to be partially captured and contained under the hull, which in turn helps lift the hull higher out of the water thereby reducing friction and drag. It is believed that many shapes and designs of structures can accomplish this outcome. Moreover, some structures may be configured to reach out in front of the vessel for greater benefit. The foregoing structures are also referred to as wave piercing structures.

It is further believed that the foregoing structures can be designed to both part an oncoming wave and to interact with the wave to alter the rate of pitch the boat would normally experience. For example, vertical wedge 172 includes horizontal fins 174 projecting laterally therefrom. Fins 174 present minimal resistance to an oncoming wave but alter the rate of rise at bow 54 because of the magnitude of wing/fin area 176 of each fin 174. In some embodiments, the angle of attack of fins 174 may be made adjustable and varied due to changing water conditions. Moreover, adjustment may be sensor and computer controlled, e.g., computerized changing of angle of attack, permitting instant changes upon sensing immersion in a wave. The action could cause bow 54 to be pulled down. The sensors could detect changes in position of wedge 172 and/or fins 174, contact with water, etc., and the positions and orientations of wedges 172 and/or fins 174 may be altered by a variety of means, e.g., servo-motors, piezo-actuators, etc.

Wedges 172 and fins 174 may be positioned such that at low speeds they do not interact with the water, however as the boat accelerates and in turn begins planing, wedges 172 and 174 become submerged, at least partially, in the water. Moreover, wedges 172 and fins 174 can be positioned such that they only interact with the water when the boat is planing and an oncoming wave strikes bow 54, e.g., a one-foot wave. It should be appreciated that wedges 172 may be formed in a variety of heights, however it is believed that a preferred embodiment includes wedges 172 having heights such that starboard side maximum height 166 and port side maximum height 168 are greater than the height of wedges 172.

In some embodiments, the present hull may further include hinged side elements 178. Hinged side elements 178 provide safety for occupants when the present hull is used for military or security related purposes. For example, hinged side elements 178 may be formed from bullet proof materials, e.g., Kevlar®, thereby preventing projectiles from reaching the boat's occupants.

In some embodiments, the present hull may further include strakes 180 and 182. It should be appreciated that strakes 180 and 182 can be considered to begin or end at stern 56 and project therefrom towards bow 54. Moreover, in some embodiments, hull 50 may include additional strakes between starboard chine 66 and hull center line 62, and port chine 70 and hull center line 62. Strakes 180 and 182 cause hull 50 to lift farther out of the water as the speed of travel of hull 50 increases. In other terms, strakes 180 and 182 act as planning surfaces thereby decreasing the amount of hull 50 in contact with the water during planning.

Lastly, it should be appreciated that although the embodiments of the present boat hull described above include curved surfaces, e.g., concave and/or convex surfaces, some embodiments may be formed from planar or warped planar surfaces. In some embodiments, boat hull 400 comprises bow 404, stern 406, starboard side 408, port side 410, hull center line 412 and bottom surface 414. Starboard side 408 comprises starboard chine 416 and starboard gunwale 418. Port side 410 comprises port chine 420 and port gunwale 422. Bottom surface 414 is formed bow 404, stern 406, starboard chine 416 and port chine 420. Bottom surface 414 comprises first, second and third portions 424, 426 and 428, respectively. First portion 424 is proximate bow 404 and comprises first warped planar surface 430 and second warped planar surface 432. First warped planar surface 430 projects from hull center line 412 downwardly towards starboard chine 416 and second warped planar surface 432 projects from hull center line 412 downwardly towards port chine 420. Second portion 426 is proximate stern 406 and includes third warped planar surface 434 and fourth warped planar surface 436. Third warped planar surface 434 projects from hull center line 412 upwardly toward starboard chine 416 and fourth warped planar surface 436 projects from hull center line 412 upwardly toward port chine 420. Third portion 428 is located between first portion 424 and second portion 426 and includes fifth warped planar surface 438, sixth warped planar surface 440, seventh warped planar surface 442, and eighth warped planar surface 444. Fifth warped planar surface 438 and sixth warped planar surface 440 are between hull center line 412 and starboard chine 416. Seventh warped planar surface 442 and eighth warped planar surface 444 are between hull center line 412 and port chine 420. Fifth warped planar surface 438 projects from hull center line 412 upwardly towards first transition 446, and sixth warped planar surface 440 projects from first transition 446 downwardly towards starboard chine 416. Seventh warped planar surface 442 projects from hull center line 412 upwardly towards second transition 448, and eighth warped planar surface 444 projects from second transition 448 downwardly towards port chine 420. Although this embodiment is described as including warped planes as opposed to concave and/or convex surfaces, the relationship of starboard chine height, port chine height, and hull center line height described above is similarly applicable. Thus, a distance between starboard gunwale 418 and starboard chine 416 is a starboard chine height, a distance between port gunwale 422 and port chine 420 is a port chine height, and a distance between hull center line 412 and a surface formed between starboard gunwale 418 and port gunwale 422 is a hull center line height. The starboard chine height and the port chine height are greater than the hull center line height between bow 404 and about one third of a distance from bow 404 to stern 406.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

Glossary of Terminology

Bottom surface—a lower surface of a vessel, ship or boat bounded by the intersections of the port and starboard chines and the lower edge of the transom, and further bounded by the transitions between the port and starboard chines and the bow Bow—a front of a vessel, ship or boat, including but not limited to, surfaces forming the front most portion of a hull of a vessel, ship or boat Chine—an edge formed between a side surface and a bottom surface of a hull Concave—curving inward, or hollowed or rounded inward, e.g., interior of a sphere or circle Concave surface—a surface formed from a continuously curved surface, or alternatively formed from a multi-chine construction, e.g., multiple warped planes collectively forming or approximating a concave surface Convex—curving or rounded outward, e.g., exterior of a sphere or circle Convex surface—a surface formed from a continuously curved surface, or alternatively formed from a multi-chine construction, e.g., multiple warped planes collectively forming or approximating a convex surface Design water line—elevation height on a vessel hull where water meets the hull when the hull is loaded to its designed capacity, e.g., the elevation height of water on a vessel hull when loaded with one thousand (1,000) pounds, and at rest.

Discontinuity—an instance of being not mathematically continuous, especially a value of an independent variable at which a function is not continuous, e.g., an immediate transition from a first curvature function to a second curvature function different than the first Gunwale—a continuous upper edge of a vessel hull's side portion Hull center line—a line generally falling along the middle of the bottom surface of the hull in a fore to aft direction, which typically coincides with the keel Inflection—a point of a curve at which a change in the direction of curvature occurs Keel—a member joining the two halves of a vessel hull bottom surface, usually along a hull center line Planar—of or relating to a geometric plane; flat or level Plane—a surface generated by a straight line moving at a constant velocity with respect to a fixed point Port side—the left side of a vessel when viewing the vessel, ship or boat toward the bow Starboard side—the right side of a vessel when viewing the vessel, ship or boat toward the bow Stern—the rearmost part of a vessel, ship or boat Transom—the flat surface forming the stern of a vessel, ship or boat Ventilation—air from the water surface or exhaust gases being drawn into propeller blades which causes the propeller to over revolve or lose thrust.

Warped plane—a plane which is bent, twisted or curved for at least some portion thereof Warped planar surface—a surface formed from a continuous plane which is bent, twisted or curved for at least some portion thereof Although the various embodiments described above are represented as a number of variations that may be included in a present hull design, any of the above described aspects may be included in an embodiment of the present hull design individually or in combination with other aspects. It should be appreciated that such variations fall within the scope of the claims recited herebelow.

What is claimed is:

1. A boat hull having a design water line, the boat hull comprising:

a bow;
a stern;
a starboard side comprising a starboard chine and a starboard gunwale, a distance between the starboard gunwale and the starboard chine is a starboard chine height;
a port side comprising a port chine and a port gunwale, a distance between the port gunwale and the port chine is a port chine height;
a hull center line, a distance between the hull center line and a surface formed between the starboard gunwale and the port gunwale is a hull center line height;
a bottom surface formed between the bow, the stern, the starboard chine and the port chine, the bottom surface comprising:
  a first portion proximate the bow and comprising a first concave surface and a second concave surface, the first concave surface projects from the hull center line towards the starboard chine and the second concave surface projects from the hull center line towards the port chine;
  a second portion proximate the stern and comprising a first convex surface and a second convex surface, the first convex surface projects from the hull center line toward the starboard chine and the second convex surface projects from the hull center line toward the port chine; and,
  a third portion between the first portion and the second portion and comprising a third concave surface and a fourth concave surface, the third concave surface is between the hull center line and the starboard chine and the fourth concave surface is between the hull center line and the port chine,
wherein the starboard chine height and the port chine height are greater than the hull center line height between the bow and about one third of a distance from the bow to the stern.

2. The boat hull of claim 1 wherein the first concave surface is formed between the hull center line and the starboard chine and the second concave surface is formed between the hull center line and the port chine.

3. The boat hull of claim 1 wherein the first portion further comprises:
  a starboard inflection outboard relative to the hull center line;
  a port inflection outboard relative to the hull center line;
  a first surface between the starboard inflection and the starboard chine; and,
  a second surface between the port inflection and the port chine.

4. The boat hull of claim 3 wherein the first surface and the second surface are warped planar surfaces.

5. The boat hull of claim 3 wherein the first surface and the second surface are convex surfaces.

6. The boat hull of claim 1 wherein the first convex surface is formed between the hull center line and the starboard chine and the second convex surface is formed between the hull center line and the port chine.

7. The boat hull of claim 1 wherein the second portion further comprises:
  a starboard inflection outboard relative to the hull center line;
  a port inflection outboard relative to the hull center line;
  a first surface between the starboard inflection and the starboard chine; and,
  a second surface between the port inflection and the port chine.

8. The boat hull of claim 7 wherein the first surface and the second surface are warped planar surfaces.

9. The boat hull of claim 7 wherein the first surface and the second surface are concave surfaces.

10. The boat hull of claim 1 wherein the third concave surface is formed between the hull center line and the starboard chine and the fourth concave surface is formed between the hull center line and the port chine.

11. The boat hull of claim 1 wherein the third portion further comprises:
  a starboard inflection outboard relative to the hull center line;
  a port inflection outboard relative to the hull center line;
  a first surface between the hull center line and the starboard inflection; and,
  a second surface between the hull center line and the port inflection.

12. The boat hull of claim 11 wherein the first surface and the second surface are warped planar surfaces.

13. The boat hull of claim 11 wherein the first surface and the second surface are convex surfaces.

14. The boat hull of claim 1 wherein the third portion further comprises:
  a starboard inflection outboard relative to the hull center line;
  a port inflection outboard relative to the hull center line;
  a first surface between the starboard inflection and the starboard chine; and,
  a second surface between the port inflection and the port chine.

15. The boat hull of claim 14 wherein the first surface and the second surface are warped planar surfaces.

16. The boat hull of claim 14 wherein the first surface and the second surface are convex surfaces.

17. The boat hull of claim 1 wherein the second portion is arranged to direct air and water moving from the first portion to the second portion towards the starboard side and the port side prior to moving past the second portion.

18. The boat hull of claim 1 wherein the first portion transitions to the third portion, and the third portion transitions to the second portion without a discontinuity.

19. The boat hull of claim 1 wherein at least one discontinuity is formed at the hull center line between at least one of: the first concave surface and the second concave surface; the first convex surface and a second convex surface; and, the third concave surface and the fourth concave surface.

20. The boat hull of claim 1 further comprising a port strake and a starboard strake, wherein each of the port strake and the starboard strake begin at the stern and project toward the bow.

21. The boat hull of claim 1 further comprising at least one wave piercing structure projecting from the first portion.

22. A boat hull having a design water line, the boat hull comprising:
  a bow;
  a stern;
  a starboard side comprising a starboard chine and a starboard gunwale, a distance between the starboard gunwale and the starboard chine is a starboard chine height;
  a port side comprising a port chine and a port gunwale, a distance between the port gunwale and the port chine is a port chine height;
  a hull center line, a distance between the hull center line and a surface formed between the starboard gunwale and the port gunwale is a hull center line height;

a bottom surface formed between the bow, the stern, the starboard chine and the port chine, the bottom surface comprising:

a first portion proximate the bow and comprising a first warped planar surface and a second warped planar surface, the first warped planar surface projects from the hull center line downwardly towards the starboard chine and the second warped planar surface projects from the hull center line downwardly towards the port chine;

a second portion proximate the stern and comprising a third warped planar surface and a fourth warped planar surface, the third warped planar surface projects from the hull center line upwardly toward the starboard chine and the fourth warped planar surface projects from the hull center line upwardly toward the port chine; and, a third portion between the first portion and the second portion and comprising a fifth warped planar surface, a sixth warped planar surface, a seventh warped planar surface, and an eighth warped planar surface, the fifth warped planar surface and the sixth warped planar surface are between the hull center line and the starboard chine, the seventh warped planar surface and the eighth warped planar surface are between the hull center line and the port chine, the fifth warped planar surface projects from the hull center line upwardly towards a first transition, the sixth warped planar surface projects from the first transition downwardly towards the starboard chine, the seventh warped planar surface projects from the hull center line upwardly towards a second transition, and the eighth warped planar surface projects from the second transition downwardly towards the port chine, wherein the starboard chine height and the port chine height are greater than the hull center line height between the bow and about one third of a distance from the bow to the stern.

23. The boat hull of claim 22 further comprising at least one wave piercing structure projecting from the first portion.

* * * * *